(12) United States Patent
Rosenberg (10) Patent No.: US 7,394,014 B2
(45) Date of Patent: Jul. 1, 2008

(54) APPARATUS, SYSTEM, AND METHOD FOR ELECTRONICALLY ADAPTIVE PERCUSSION INSTRUMENTS

(75) Inventor: Louis B Rosenberg, Pismo Beach, CA (US)

(73) Assignee: Outland Research, LLC, San Luis Obispo, CA (US)

( * ) Notice: Subject to any disclaimer, the term of this patent is extended or adjusted under 35 U.S.C. 154(b) by 58 days.

(21) Appl. No.: 11/421,394

(22) Filed: May 31, 2006

(65) Prior Publication Data

US 2006/0275631 A1 Dec. 7, 2006

Related U.S. Application Data

(60) Provisional application No. 60/687,001, filed on Jun. 4, 2005.

(51) Int. Cl.
*G10H 3/14* (2006.01)
*G10D 13/02* (2006.01)

(52) U.S. Cl. ........................... 84/725; 84/411 R (58) Field of Classification Search ............... 84/411 R, 84/411 M, 422.3, 726, 725, 423; 429/8
See application file for complete search history.

(56) References Cited

U.S. PATENT DOCUMENTS

| | | | | |
|---|---|---|---|---|
| 4,242,937 A | * | 1/1981 | Pozar | 84/725 |
| 4,271,745 A | * | 6/1981 | Shatto | 84/402 |
| 4,608,483 A | * | 8/1986 | Arnold et al. | 219/201 |
| 4,779,509 A | * | 10/1988 | Weir | 84/421 |
| 5,271,858 A | | 12/1993 | Clough | |
| 5,382,373 A | | 1/1995 | Carlson | |
| 5,578,238 A | | 11/1996 | Weiss | |
| 5,599,474 A | | 2/1997 | Weiss | |
| 5,645,752 A | | 7/1997 | Weiss | |
| 5,906,767 A | | 5/1999 | Karol | |
| 6,151,930 A | | 11/2000 | Carlson | |
| 6,376,971 B1 | | 4/2002 | Pelrine | |
| 6,483,017 B1 | * | 11/2002 | Dill et al. | 84/411 R |
| 6,696,630 B2 | | 2/2004 | Gatzen | |

(Continued)

OTHER PUBLICATIONS

"High-field electrostriction of elastomeric polymer dielectrics for actuator," by Kombluh et al., SPIE Conf. on Electroactive Polymer Actuators and Devices, SPEE vol. 3669, 1999.

(Continued)

*Primary Examiner*—Jeffrey Donels
(74) *Attorney, Agent, or Firm*—Thomas F. Lebens; Sinsheimer Juhnke Lebens & McIvor, LLP (57) ABSTRACT

An apparatus, system and method for electronically controlling the acoustical characteristics of certain percussion musical instruments such as acoustical drums and cymbals are provided. The various embodiments incorporate one or more electroactive materials which are conjoined to the vibratory elements associated with a drumhead or cymbal. A processing unit may be provided to electronically control the electroactive materials in dependence on signals received from the electroactive materials, and/or separate acoustical sensors. The processing unit may also control the electroactive materials in dependence upon user input signals, pre-programmed profiles, and/or pre-programmed threshold values. In this way the present invention may selectively and dynamically vary the tonal qualities and/or muting characteristics of percussion musical instruments in accordance with the needs and/or desires of a user.

26 Claims, 7 Drawing Sheets

U.S. PATENT DOCUMENTS 6,852,251 B2 2/2005 Sheng
2002/0184992 A1* 12/2002 Brando .................... 84/411 R
2006/0075876 A1* 4/2006 May ........................ 84/411 M

OTHER PUBLICATIONS

"Electro-mechanics of ionoelastic beams as electrically-controllable artificial muscles," by M. Shahinpoor, SPIE Conf. on Electroactive Polymer Actuators and Devices, SPEE vol. 3669, 1999.

"Polymer Electrolyte Actuator with Gold Electrodes," by K. Oguro et al., SPIE Conf. on Electroactive Polymer Actuators and Devices, SPEE vol. 3669, 1999.

"Microgripper design using electro-active polymers," by R. Lumia et al., SPIE Conf. on Electroactive Polymer Actuators and Devices, SPEE vol. 3669, 1999.

* cited by examiner

APPARATUS, SYSTEM, AND METHOD FOR ELECTRONICALLY ADAPTIVE PERCUSSION INSTRUMENTS

CROSS-REFERENCE TO RELATED APPLICATIONS

This application is a non-provisional application claiming benefit and priority under 35 U.S.C. § 119(e) from applicant's co-pending U.S. provisional applications Ser. No. 60/687,001, entitled "Method and Apparatus for Electronically Adaptive Drumheads and Cymbals," and filed on Jun. 4, 2005. U.S. patent application Ser. No. 11/341,743, entitled "Method and Electroactive Device for a Dynamic Graphical Imagery Display," filed on Jan. 27, 2006 to the instant applicant is a related patent application. The aforementioned provisional and utility patent applications are hereby incorporated by reference in their entireties as if fully set forth herein.

FIELD OF INVENTION

The present invention relates generally to control circuits for musical instruments, and more specifically to an apparatus, system, and method for electronically controlling at least one acoustical characteristic using electroactive materials.

BACKGROUND

Real time or near real time adjustment of percussion instruments is difficult due to the multitude of adjustments which need to be performed to obtain a desired acoustical characteristic and/or attenuate an undesirable acoustical characteristic. For example, modem drum sets include multiple adjustment points periodically disposed around the cylinder forming the drum housing. The adjustment points allow a musician to adjust the tension of the drum membrane in a two dimensional plane. Adjustment of the tension placed on the drum membrane is generally performed by trial and error by alternately tightening and/or loosening one or more set of adjustment points until the desired acoustical characteristic is obtained. In another example, cymbals are typically suspended from an axial mount which traverses the geometric center of the instruments. One or more axial adjustment points are included to control the length of vibration when the cymbals are struck. The adjustment points allow the musician to dampen or mute excessive ringing and/or amplitude of a particular acoustical characteristic. Likewise, the tuning process is often iterative and time consuming which requires repeated trial and error to obtain the desired acoustical characteristic. In both situations, adjustment of these percussion instruments necessarily is limited to before or after a performance. A musician cannot adjust the acoustical characteristics during a performance. Therefore, a mechanism which allows a musician to vary the acoustical characteristics during a performance and/or simplifies the tuning process would be a highly desirable feature currently lacking in the relevant art.

SUMMARY

This disclosure addresses the deficiencies of the relevant art and provides exemplary apparatus, systematic, and methodic embodiments for electronically controlling percussion instruments. In an exemplary apparatus embodiment, an apparatus is provided for controlling the acoustical characteristics of a percussion instrument.

The exemplary apparatus comprises an electroactive material conjoined to a vibratory element associated with the percussion instrument; an electromotive force generator operatively coupled to the electroactive material and configured to provide an electromotive force to produce a conformational change in the electroactive material sufficient to induce an acoustical characteristic change in the vibratory element; and a controller unit coupled to the electromotive force generator and configured to cause the electromotive force generator to provide the sufficient electromotive force in at least partial dependence on one or more of a dynamic sensor signal and a user input signal.

In various exemplary apparatus embodiments, the vibratory element includes a cymbal and/or a drum head. In various related exemplary apparatus embodiments, the electroactive material may be constructed from an electroactive polymer, magnetorheological fluids and electrorhelogical fluids. Alternately, or in addition thereto, the electroactive material may be disposed as a laminate within a polymeric matrix coupled to the vibratory element and/or within a polymeric matrix which comprises the vibratory element.

In another exemplary related apparatus embodiment, the electromotive force generator is configured to generate an electromotive force in excess of 400 volts to cause electroexpansion of the electroactive material.

In various related exemplary apparatus embodiments, the controller unit is configured to vary the electromotive force in accordance with a predetermined force requirement and may include a programmable logic circuit configured to vary the electromotive force in accordance with a logical representation of the predetermined force requirement, and/or a time-varying profile. The controller unit may be configured to dynamically receive sensor signals generated by the electroactive material when the electroactive material is deformed by a physical force. This exemplary configuration may dynamically vary with the electromotive force in at least partial dependence on the received dynamic sensor signals.

In an exemplary systematic embodiment, a system for controlling the acoustical characteristics of a percussion instrument is provided. The exemplary systematic embodiment comprises an electroactive material conjoined to a vibratory element associated with the percussion instrument; an electromotive force generator operatively coupled to the electroactive material and configured to provide an electromotive force to produce a conformational change in the electroactive material sufficient to induce an acoustical characteristic change in the vibratory element; a controller unit coupled to the electromotive force generator and configured to cause the electromotive force generator to provide the electromotive force in dependence on a control signal; and a processing unit operatively coupled to the controller unit; the processing unit being programmed to dynamically provide the control signal to the controller unit in at least partial dependence on one of; a dynamic sensor signal, a user input signal, a predetermined profile and any combination thereof.

In related exemplary systematic embodiments, the processing unit is further programmed to; analyze the dynamic sensor signal for at least one acoustical characteristic, determine a sufficient electromotive force to be applied to the electroactive material and send the control signal to the controller unit to apply the determined electromotive force.

In other related exemplary systematic embodiments, the at least one acoustical characteristic is one of; frequency response, resonance time, vibratory amplitude and any combination thereof. The at least one acoustical characteristic may be provided dynamically in dependence on the dynamic sensor signal in a feedback relationship where the electroactive material provides the dynamic sensor signal to at least the controller unit.

In another related exemplary systematic embodiment, the sensor signal may be generated by the electroactive material in response to a deformation force being applied to the vibratory element.

In yet another related exemplary systematic embodiment the term conjoined includes at least one of: integrated into the vibratory element, affixed to the vibratory element and coupled to the vibratory element through an intervening material.

In still another related exemplary systematic embodiment, the electroactive material is disposed such that application of the determined electromotive force induces sufficient electro-expansion of the electroactive material to cause the vibratory element to change the at least one acoustical characteristic produced by the percussion instrument.

In an exemplary methodic embodiment, a method for controlling an acoustical characteristic of a percussion instrument is provided. The exemplary methodic embodiment comprises; providing an electroactive material conjoinable to at least a portion of a vibratory element associated with the percussion instrument, where the electroactive material is conjoined to the vibratory element such that application of a sufficient electromotive force to the electroactive material induces an acoustical characteristic change in the vibratory element; and providing a controller unit configured to control the electromotive force generator in at least partial dependence on one of; a dynamic sensor signal and a user input signal.

In a related exemplary methodic embodiment, the processing unit may be further programmed to dynamically control the controller unit in response to the dynamic sensor signal.

In another related exemplary methodic embodiment, the processing unit may be further programmed to analyze the received sensor signal for at least one acoustical characteristic, determine the sufficient electromotive force to be applied to the electroactive material and cause the controller unit to apply the determined sufficient electromotive force.

In yet another related exemplary methodic embodiment, the vibratory element may be associated with one of, a cymbal and a drum head.

In still another related exemplary methodic embodiment, the processing unit may be further programmed to cause the controller unit to dynamically apply the electromotive force in accordance with a predetermined profile.

In still other related exemplary methodic embodiments, the processing unit may be further programmed to cause the controller unit to dynamically apply the electromotive force in at least partial dependence on a predetermined threshold level; where the predetermined threshold level is user adjustable through a user interface associated with the processing unit.

BRIEF DESCRIPTION OF THE DRAWINGS

The features and advantages will become apparent from the following detailed description when considered in conjunction with the accompanying drawings. Where possible, the same reference numerals and characters are used to denote like features, elements, components or portions. Optional components or feature are generally shown in dashed or dotted lines. It is intended that changes and modifications can be made to the described embodiment without departing from the true scope and spirit of the subject invention.

DETAILED DESCRIPTION

In various embodiments, electronically controllable muffling and/or tonal quality adjustment of percussion musical instruments, such as acoustical drums and cymbals, is provided through the use of an electroactive material positioned either proximal to or conjoined with within a vibrating element associated with a musical instrument. In addition, in certain embodiments the electroactive material may serve as a trigger for electronically synthesized sounds, the synthesized sounds being dependent upon both the timing and magnitude of strikes to the percussion musical instruments. In general, the various embodiments incorporate one or more electroactive materials which are affixed to and/or integrated within one or more vibratory elements of a drumhead or cymbal. One such electronically adjustable material employed by some embodiments is an electroactive polymer material. Other electronically adjustable materials which may be employed in the various embodiments include electrorhelogical and/or magnetorheological fluids. The electrorhelogical fluids, magnetorheological fluids and electroactive polymer materials are collectively referred to herein as electroactive materials. As used herein, an electroactive material is a material having one or more physical material properties that may be varied under electronic control.

Where necessary, computer programs, algorithms and routines are envisioned to be programmed preferably in a high level language using an object oriented code, for example Java™, C, C++, C#, or Visual Basic™.

Figure 1:
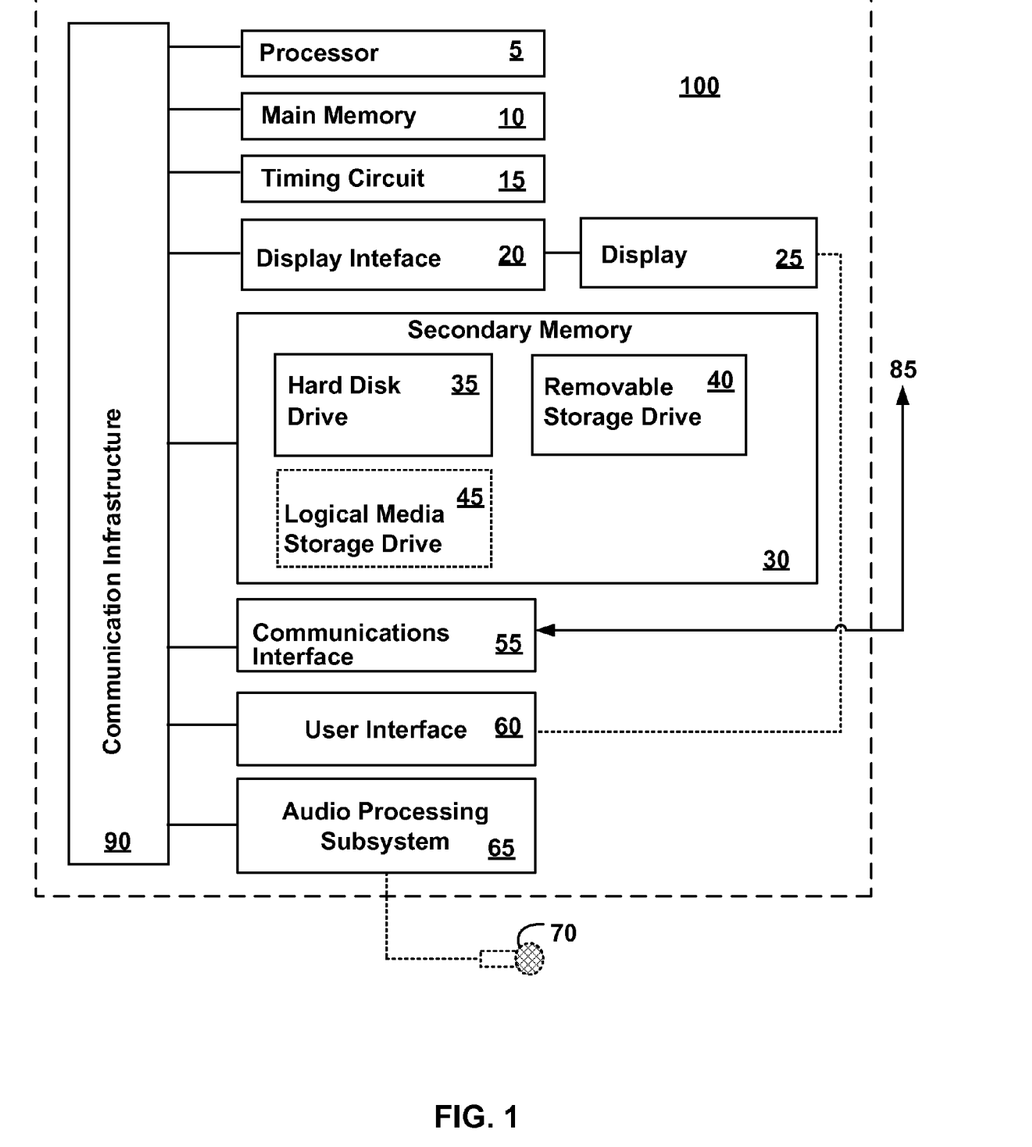
FIG. 1—depicts a generalized and exemplary block diagram of a general purpose computer system suitable for use in the various embodiments described herein.

Referring to FIG. 1, an exemplary and generalized block diagram of a general purpose computer system 100 is depicted. The computer system 100 may be incorporated into another highly portable device such as a personal data assistant (PDA), laptop, palmtop, embedded device or cellular telephone. The computer system 100 includes a communications infrastructure 90 used to transfer data and memory addresses where data files are to be found, control signals among the various components, subsystems and other devices associated with the computer system 100. A processor 5 is provided to interpret and execute logical instructions stored in the main memory 10. The main memory 10 is the primary general purpose storage area for logical instructions and data to be processed by the processor 5. The term "memory" is to be interpreted in its broadest sense and includes both main memory 10 and secondary memory 30.

A timing circuit 15 is provided to coordinate programmatic activities within the computer system 100 in near real time. The timing circuit 15 may be used as a watchdog timer, clock or a counter arrangement and may be programmable.

The processor 5, main memory 10 and timing circuit 15 are directly coupled to the communications infrastructure 90. A display interface 20 is provided to drive a display 25 associated with the computer system 100. The display interface 20 is electrically coupled to the communications infrastructure 90 and provides signals to the display 25 for visually outputting both graphical displays and alphanumeric characters.

The display interface 20 may include a dedicated graphics processor and memory (not shown) to support the displaying of graphics intensive media. The display 25 may be of any type (e.g., cathode ray tube, gas plasma, liquid crystal display).

A secondary memory subsystem 30 is provided which houses retrievable storage units such as a hard disk drive 35, a removable storage drive 40, and an optional logical media storage drive 45. One skilled in the art will appreciate that any of the electromechanical storage drives may be replaced with flash RAM. The removable storage drive 40 may be a replaceable hard drive, optical media storage drive or a solid state flash RAM device.

A communications interface 55 subsystem is provided which allows for standardized electrical connection of peripheral devices to the communications infrastructure 90 including, serial, parallel, USB, and Firewire™ connectivity. In addition, the communications interface includes commonly employed networking capabilities known in the relevant art including both wired and wireless types including, BlueTooth™, or the various IEEE standards 802.11x, where x denotes the various present and evolving wireless computing standards (e.g., 802.11a,b,g,n); WiMax 802.16 and WRANG 802.22. The communications interface 55 facilitates the remote exchange of data, control signals and sensor signals between the computer system 100 and the other devices in network communications 85 with the computer system 100.

A user interface 60 is electrically coupled to the communications infrastructure 90. For purposes of this specification, the term user interface 60 includes the hardware and software by which a user interacts with the computer system 100 and the means by which the computer system 100 conveys information to the user. The user interface 60 may also include user manipulable controls that interact with the display interface 20 and/or operatively coupled display 25. The user interface 60 employed may include a pointing device such as a mouse, thumbwheel or track ball, an optional touch screen, one or more push-button switches, one or more sliding or circular rheostat controls and one or more foot pedals. The user interface 60 may also be divided into a local controls 110 portion existing in proximity to the percussion instruments and/or associated with the computer system 100. The user interface 60 provides interrupt signals to the processor 5 via the communications infrastructure 90 that may be used to interpret user interactions with the computer system 100. One skilled in the art will appreciate that the user interface devices which are not shown are well known and understood in the relevant art. Various portions of the user interface 60 may be selectively manipulated by the musician to provide the desire acoustical control of the acoustical properties of one or more controlled percussion instrument vibratory elements.

Figure 1A:
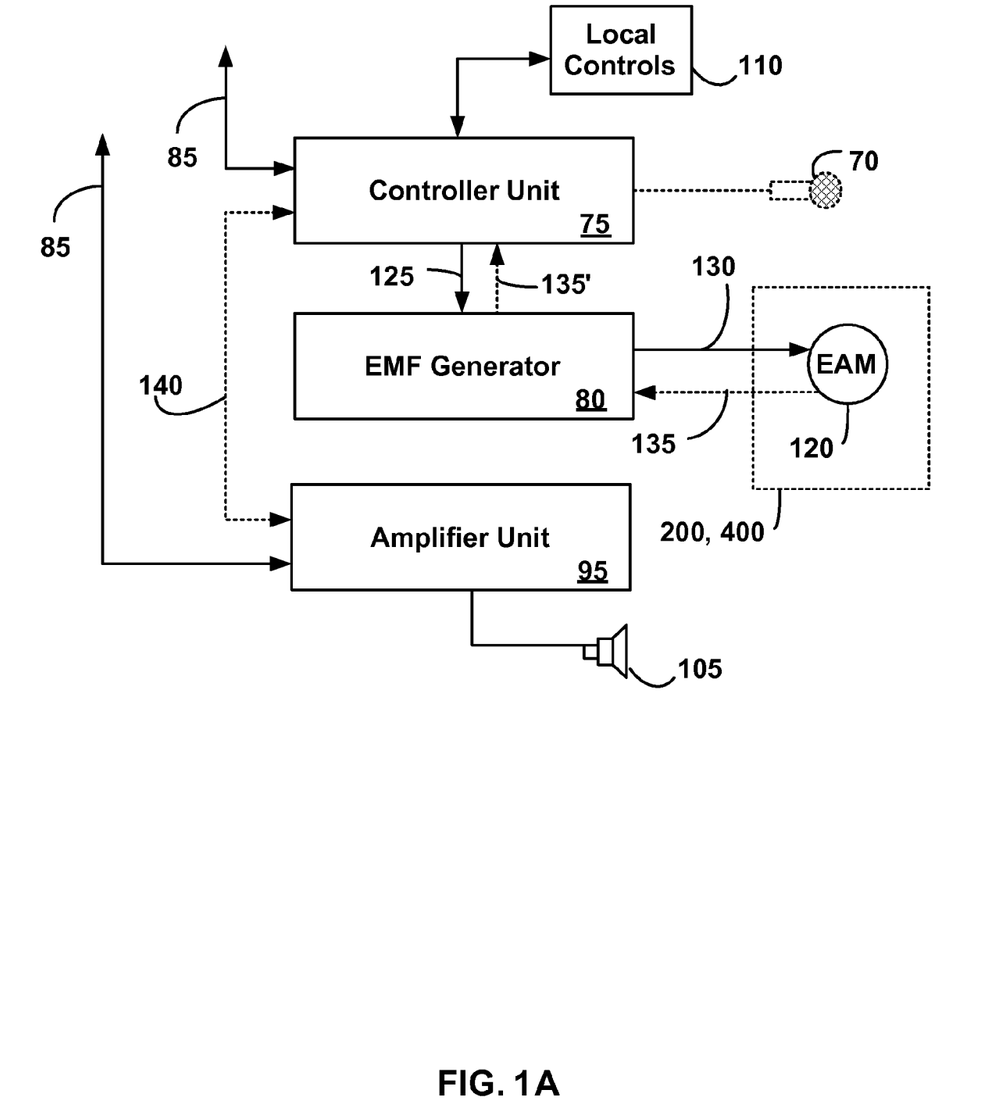
FIG. 1A—depicts a generalized and exemplary block diagram of a controller unit and electromotive force generator electrically coupled to an electroactive material.

Lastly, an audio processing subsystem 65 is provided and electrically coupled to the communications infrastructure 90. The audio processing subsystem 65 performs the audio signal analyses to determine the amount and timing of the acoustical control feedback required to obtain a desired acoustical characteristic from the percussion instrument 200, 400 (FIG. 1A.) In an embodiment, the audio processing subsystem 65 may include a microphone 70 for input of audio signals received from the one or more percussion instruments 200, 400. In another embodiment, responsive acoustical dynamic signals generated by the actual electroactive materials 120 (FIG. 1A) may be used to determine the required amount of acoustical control to be presented to the electroactive materials 120. Electrostrictive type electroactive polymer materials are particularly well suited for such embodiments because such materials may be used both as a physical actuator that changes its material properties in response to an applied electromotive force and as an event sensor that produces an electronic signal in response to a physical deformation. This dual usage of an electroactive polymer material is described in more detail below.

The computer system 100 includes an operating system, the necessary hardware and software drivers necessary to fully utilize the devices coupled to the communications infrastructure 90, and at least one application operatively installed in the main memory 10 functional to receive audio signals processed by the audio processing subsystem 65 and send appropriately determined control signals to a controller unit 75 (FIG. 1A) via the network 85 or direct wire connection. One skilled in the art will appreciate that the computer system 100 may be integrated into the controller unit 75 as an embedded device. As such, the computer system 100 is hereinafter referred to generically as a processing unit.

FIG. 1A depicts a generalized and exemplary block diagram of a controller unit 75 operatively coupled 125 to an electromotive force generator 80. The electromotive force generator 80 is electrically coupled 130 to an electroactive material 120. The controller unit 75 includes the necessary control logic to adjust the voltage being applied to the electroactive material 120 by the electromotive force generator 80. For embodiments utilizing electroactive polymer materials, the voltage is generally applied to a set of electrodes that are affixed to and/or integrated within the electroactive polymer material. In general electroactive polymer materials utilize voltages in excess of 400V.

For embodiments utilizing rheological fluids, for example magnetorheological fluids, the voltage is generally applied to an induction coil (not shown) co-located with the electroactive material 120 to generate a sufficient magnetic field to activate the magnetorheological fluid contained in the electroactive material 120. In various embodiments that employ rheological fluids, the rheological fluids may be impregnated within a foam and/or polymeric matrix to achieve the desired electronically adjustable material properties in a convenient form factor. One skilled in the art will appreciate that multiple electroactive materials 120 may be individually controlled by the processing unit 100 in conjunction with the controller unit 75 utilizing a multiplexer and/or a high speed switching arrangement. For example, multiple electroactive material actuators 120 may be coupled to the controller unit 75 from a plurality of separate vibratory control elements associated with for example a drum set.

For embodiments utilizing electroactive polymer materials, forced deformation of the material will result in an induced electronic signal being generated across the electrodes. The time varying profile of the induced electronic signals will be proportional to and/or representative of the time varying characteristics of the forced deformation of the electroactive material 120 in response to a musician's use of the instrument. In this way, an electroactive polymer material 120 affixed to a vibratory element of a musical instrument allows direct sensing of the acoustical characteristic signals 135 produced by the vibratory element 200, 400 during use.

The acoustical characteristics signals 135 derived from the electroactive material 120 may be returned 135' by the electromotive force generator 80 to the controller unit 75 and/or sent by the network 85 to the processing unit 100 for analyses by the audio processing subsystem 65. In this way, one or more sets of electroactive material 120 may be used as both an actuator for electronically controlling the acoustical characteristics such as muffling and/or tonal qualities of the percussion musical instrument and as an electronic feedback sensor for detecting acoustical characteristic signals 135 produced by the vibrating element 200, 400 of the associated musical instrument. Alternately, or in addition thereto, a separate sensor 70, in the form of a microphone, may be used to provide the acoustical characteristics signals 135 to the controller unit 75. Depending on the resolution time (acoustical signal generation and a processing), adjustment of the vibratory element 200, 400 may performed in near real time in which the applied electromotive force 130 is modulated or varied at a particular frequency as a feedback signal to accentuate or inhibit one or more acoustical characteristics produced by the vibratory element 200, 400.

The acoustical characteristics of the feedback signal 135 would be determined by the processing unit 100 and sent via the network 85 to the controller unit 75 for application by the electromotive force generator 80. The processing unit 100 may be programmed to allow the musician the ability to adjust the profile of electromotive force sent to one or more electroactive materials 120. Electromotive force profiles may be modulated to include a time-varying signal. For example, the time-varying signal may ramp shaped, sinusoidal wave or square wave, or saw-toothed wave shaped.

In an embodiment, the feedback signals 135, 135' may used to synthesize acoustical effects. The feedback signals 135, 135' are transmitted via the network 85 to the processing unit 100 for processing by the audio processing subsystem 65. The processed output is returned via the network 85 to either the controller unit 75 for routing 140 to an amplifier unit 95 or sent directly to the amplifier unit 95 via the network 85. The audio processing subsystem 65 may be used in various modes. For example, feedback signals 135, 135' which include undesirable acoustical characteristics may be processed by the audio processing subsystem 65 to filter the undesirable acoustical characteristics. The processed output is then routed via the network 85 for amplification by the amplifier unit 95 without the undesirable acoustical characteristics being present for output by one or more speakers 105.

Alternately, or in combination therewith, the audio processing subsystem 65 may be used to accentuate desirable acoustical characteristics. The processed output is then routed via the network 85 for amplification by the amplifier unit 95 including the accentuated desirable acoustical characteristics being present for output by one or more speakers 105. In a final embodiment, the audio processing subsystem 65 may be used to synthesize sound effects utilizing the feedback signals 135, 135' as a time varying input for eventual amplification and output by one or more speakers 105.

Lastly, a set of local controls 110 may be provided in proximity to the percussion musical instrument to allow a musician to manually adjust the acoustical characteristics by simple manipulation of a slide potentiometer, knob, or foot pedal without having to rely on a separate processing unit 100.

Figure 2:
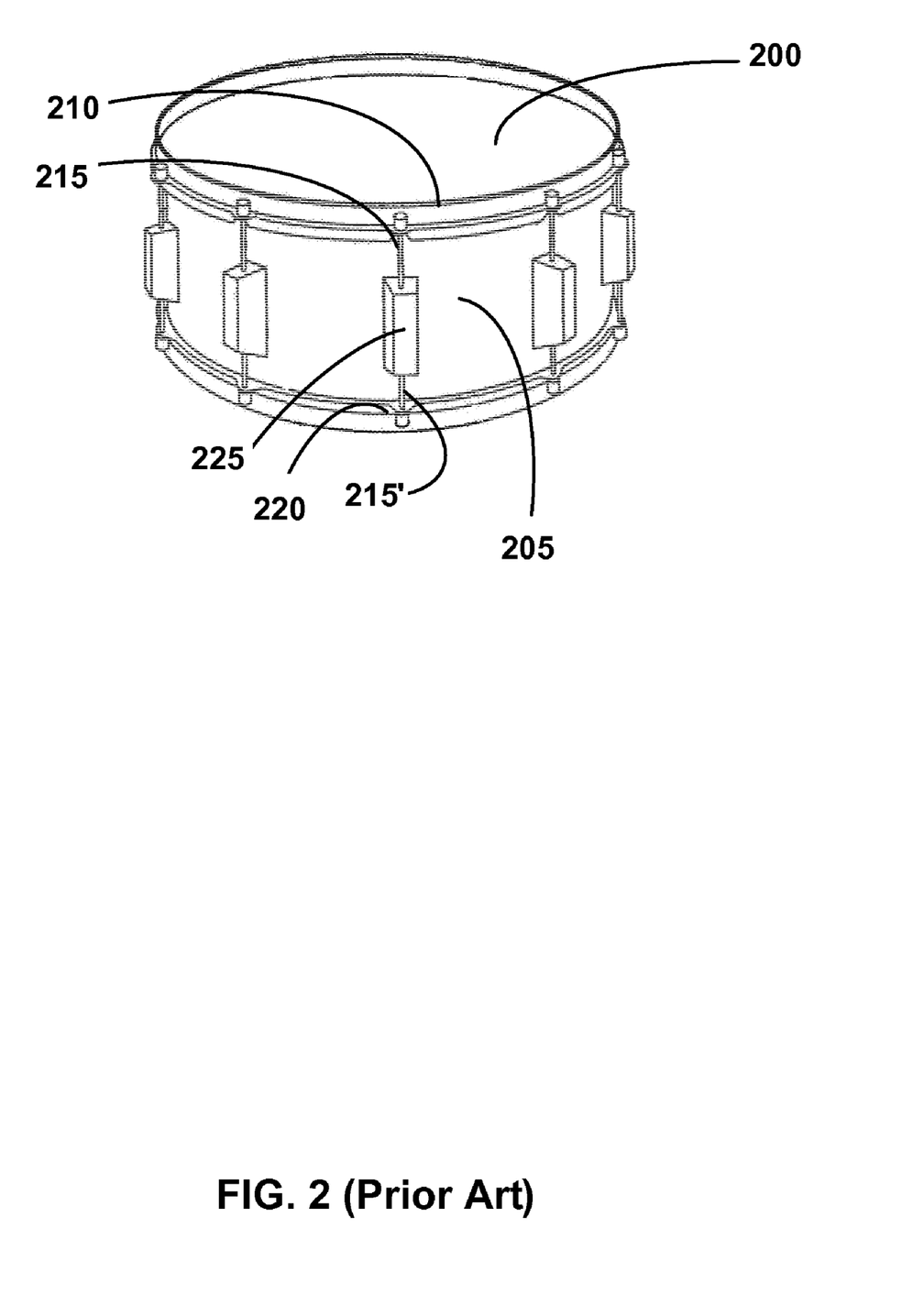
FIG. 2—depicts a prior art drum head tensioning arrangement for which the various embodiments described herein improve upon.

FIG. 2 depicts a prior art drum head tensioning arrangement for which the various embodiments described herein improve upon. The drum head 210 includes a vibratory element 200. The tension applied to the vibratory element 200 is adjusted by sequentially tightening and loosening axially aligned bolts 215, 215' which either compress or loosen rings 210, 215 that apply tension to the vibratory element 200 when threaded into a lug 225 affixed to the side of the drum 205. Adjustment of the acoustical characteristics of the drum 205 involves a time consuming trial and error process which is difficult to adjust during usage or short intermissions there between.

Typical vibratory elements 200 are made of polyester film and are tightened to substantial tensions. In many case, when the vibratory element 200 is tightened to obtain a desired acoustical characteristic, other acoustical characteristics of the drum may become undesirable such as excessive volume and unwanted overtones. The unwanted overtones are higher pitched frequencies usually produced from the outside edge (perimeter) of the vibratory element 200. These frequencies represent the most distant pitch or harmonic relationships from the fundamental pitch produced by the vibratory element 200. They produce a "metallic" type sound that must be properly balanced to produce a good drum sound, called, "overtone suppression". When overtones are out of balance, or totally eliminated, the overall tonal quality of the drum is severely diminished. To eliminate such deleterious acoustical characteristics, much effort has been directed at muting drums and/or modifying the overtone characteristics by adding material or imparting contact forces that have damping characteristics and/or other tonal quality modifying characteristics.

Devices for adjusting or tuning the sound produced by a percussion instrument are well known in the art. For example, U.S. Pat. No. 6,696,630, entitled "Damping Device for Percussion Instruments," filed Jun. 19, 2002 to Gatzen, which is hereby incorporated by reference, discloses a device for muting the sound produced by the vibratory element 200. As described in this patent, there have been many attempts to create efficient damping systems for the drum set, specifically, the tom-toms and snare drum components. To date, there is not a standard damping method for drums that is recognized in the field.

Figure 3:
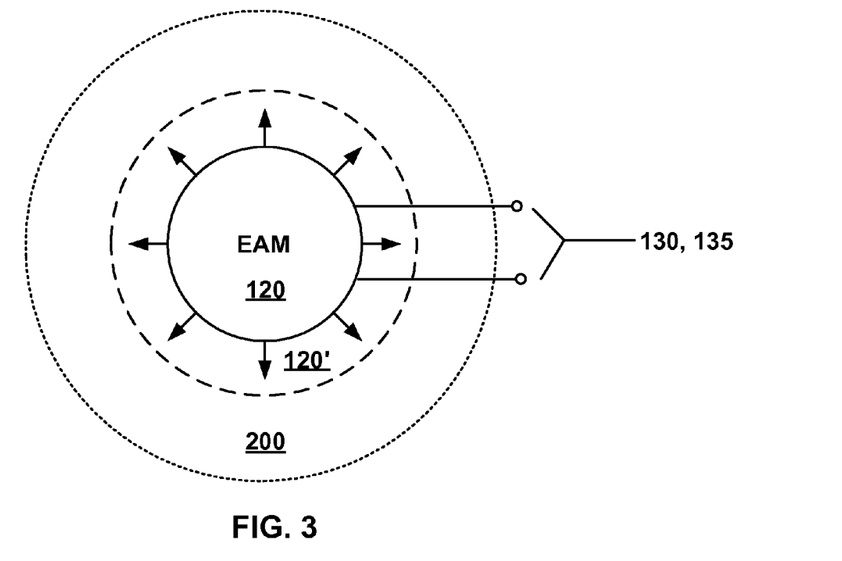
FIG. 3—depicts an exemplary embodiment in which an electroactive material is used for tensioning of a drum head.

FIG. 3 depicts an exemplary embodiment in which an electroactive polymer type of electroactive material 120 is used for tensioning of the vibratory element 200 included in a drum head. The electroactive material 120 is conjoined to the vibratory element 200 such that application of an electromotive force 130 causes the electroactive material 120' to expand. The expanded electroactive material 120' exerts in this exemplary embodiment, a planar tension on the vibratory element 200 which changes the acoustical characteristics generated by the vibratory element 200. In various embodiments, the electroactive material 120 may configured to exert tension or shear forces in specific dimensions by either providing pre-stressed sections of the electroactive material 120 and/or altering the geometric shape and/or location(s) in which the electroactive material 120 is conjoined to the vibratory element 200. One skilled in the art will appreciate that multiple electroactive material 120 elements may be strategically placed on the vibratory element 200 to accentuate or inhibit a particular acoustical characteristic generated by the vibratory element 200. The thickness of the electroactive material 120 should be limited to avoid imparting undesirable acoustical characteristics to the vibratory element 200. Likewise, the electroactive material 120 should be dimensioned so as to limit imparting any undesirable acoustical characteristics to the vibratory element 200.

There are three basic types of electroactive materials, magnetorheological fluids (MR), electrorhelogical fluids (ER) and electroactive polymers (EAP). A brief discussion of each of the electroactive materials is provided below.

Magnetorheological fluids (MR), as is disclosed in U.S. Pat. No. 5,906,767, entitled "Magnetorheological Fluid," filed Oct. 28, 1997 to Karol which is hereby incorporated by reference, describes fluid compositions that undergo a change in viscosity in the presence of a magnetic field is commonly referred to as Bingham magnetic fluids or magnetorheological fluids which typically include magnetic-responsive particles dispersed or suspended in a carrier fluid.

In the presence of a magnetic field, the magnetic-responsive particles become polarized and are thereby organized into chains of particles or particle fibrils within the carrier fluid. The chains of particles act to increase the apparent viscosity or flow resistance of the overall materials resulting in the development of a solid mass having a yield stress that must be exceeded to induce onset of flow of the MR fluid. The force required to exceed the yield stress is referred to as the "yield strength".

In the absence of a magnetic field, the particles return to an unorganized or free state and the apparent viscosity or flow resistance of the overall materials is correspondingly reduced. Such absence of a magnetic field is referred to herein as the "off-state". MR fluids are also described in U.S. Pat. No. 5,382,373, entitled "Magnetorheological Materials Based on Alloy Particles," filed Oct. 30, 1992 to Carlson, U.S. Pat. No. 5,578,238 entitled "Magnetorheological Materials Utilizing Surface-Modified Particles," filed Apr. 13, 1994 to Weiss, U.S. Pat. No. 5,599,474 entitled "Temperature Independent Magnetorheological Materials," filed Apr. 18, 1994 to Weiss, and U.S. Pat. No. 5,645,752, entitled "Thixotropic Magnetorheological Materials," filed Dec. 20, 1995 to Weiss. These patents discuss the use of phosphate based esters which are useful as surfactants in MR fluids. U.S. Pat. No. 5,645,752 describes a MR fluid example formulation that includes a polyoxyalkylated alkylaryl phosphate ester. The aforementioned patents are hereby incorporated by reference.

Electrorhelogical fluids (ER) as is disclosed in U.S. Pat. No. 6,852,251, entitled "Electrorheological Fluids," filed Sep. 16, 2002 to Kowloon, which is hereby incorporated by reference, includes colloidal suspensions whose rheological properties can be varied through the application of an external electric field, enabling variable viscosity under electronic control. Under the application of an appropriate field an ER can exhibit a solid-like behavior, such as the ability to transmit sheer stress. This transformation from liquid-like to solid-like behavior can be very fast, of the order of 1 to 10 milliseconds, and is reversible when the electric field is removed. U.S. Pat. No. 5,271,858, entitled "Field Dependent Fluids Containing Electrically Conductive Tin Oxide Coated Materials," filed Jan. 2, 1992 to Clough, which is hereby incorporated by reference, describes an ER fluid that includes esters and amides of an acid of phosphorus and is herein incorporated by reference.

Both magnetorheological fluids and electrorhelogical fluids may be incorporated into a solid foam matrix, which greatly enhances the usability of these specialized fluids. For example, Lord Corporation, www.lord.com offers rheological fluid incorporated into a foam matrix such that the stiffness of the solid foam can be modulated directly when current is applied to an electrode (creating a magnetic field) proximate to the foam matrix. As disclosed in U.S. Pat. No. 6,151,930, entitled, "Washing Machine Having A Controllable Field Responsive Damper," filed Dec. 09, 1999 to Carlson, which is hereby incorporated by reference, discloses such a solid foam matrix which has been used to selectively control unwanted oscillations in heavy machinery such as washing machines.

As described herein, various embodiments include a resilient material incorporating or embodying such a foam matrix impregnated with a rheological fluid, where the resilient material is affixed to an vibratory element 200 or conjoined in a laminate layer with the vibratory element 200 and when controlled with a modulated electronic signal as described herein, allowing for the electronically adjustable muting and/or tonal characteristics of the percussion instrument's vibratory element 200.

Electroactive Polymer Materials (EAP) are a class of polymers which can be formulated and/or processed to exhibit a wide range of physical, electrical, and electro-optical behaviors and properties. When activated, EAP materials can undergo significant physical movement or deformations, typically referred to as electrostriction. These deformations can be along the length, width, thickness, radius, etc. of the material and in some cases can exceed 100% strain. When affixed to or integrated within a vibratory element 200, such deformation may be used to affect the acoustical characteristics of the percussion instrument's vibratory element 200.

Many EAP materials can also act as high quality sensors, particularly for time-varying (i.e. alternating current) signals. When mechanically deformed (e.g. by bending, pulling, etc.), most EAP materials develop differential voltages which can be electrically measured. This ability to essentially generate electric potential makes EAP devices ideal to detect the timing and magnitude of stick strikes to drumheads and/or resulting vibration to drumheads that have EAP materials affixed to or integrated within them. Many of the EAP materials exhibit bi-directional behavior, which allows use as either sensors or actuators, or act simultaneously as both sensors and actuators, depending on a particular system design. As such, the embodiments incorporating EAP materials may be used to produce electronically modulated sounds, including sounds not generally provided by the percussion instruments.

In an embodiment, the electronically controllable acoustical characteristics may be configured to support a time delay after a drum and/or cymbal strike. This feature provides the ability to be electronically mute a vibratory element 200 after it is struck by for time-based muting. For example, a drum or cymbal may be allowed to ring loudly after a strike by a drummer for a certain amount of time and then be selectively muted, ending or reducing the sound to a predetermined level. In addition, threshold levels can be set such that the level of muting imparted by the EAP material is dependent upon the magnitude of the strike (or resulting vibration) detected by the EAP sensing capabilities.

In this way a drum or cymbal can be configured with a low level of muting based upon the electronic signal sent to the EAP material, but when a strike (or resulting vibration) is detected by the EAP sensor that is above a certain threshold (or thresholds) a higher level of muting is imparted. The level of muting imparted can also be dependent upon time delays as well as threshold levels such that the higher level of muting is imparted only if a certain threshold level is exceeded as detected by the EAP sensor and only after a certain time delay has expired. In addition muting levels can be gradually modulated over time, ramping up over a period of time after a drum strike (or vibration) above a certain magnitude is detected. Threshold levels, time delay levels, muting levels and/or muting profiles are parameters that can be user adjustable through the control electronics of the current invention. The slope of the ramp profile, for example, can also be a configurable parameter within the electronic that control the EAP material.

A variety of EAP structures are described in the papers, "High-field electrostriction of elastomeric polymer dielectrics for actuator," by Kombluh et al., "Electro-mechanics of ionoelastic beams as electrically-controllable artificial muscles," by M. Shahinpoor, "Polymer Electrolyte Actuator with Gold Electrodes," by K. Oguro et al., and "Microgripper design using electro-active polymers," by R. Lumia et al., all SPIE Conf. on Electroactive Polymer Actuators and Devices, SPEE Vol. 3669, 1999, all of which are herein incorporated by reference.

An electrostrictive EAP material may be deformed uniformly or non-uniformly, across the entire material or at select portions of the material, depending upon how electricity is applied. In general, the use of such material properties has been to develop actuators (motors) for powering movable robots and mechanical equipment. For example, U.S. Pat. No. 6,376,971, entitled "Electroactive Polymer Electrodes," filed 07/20/200 to Pelrine, which is hereby incorporated by reference, provides specific methods for stretching polymer materials by larger and larger factors by applying electrical energy.

Figure 3A:
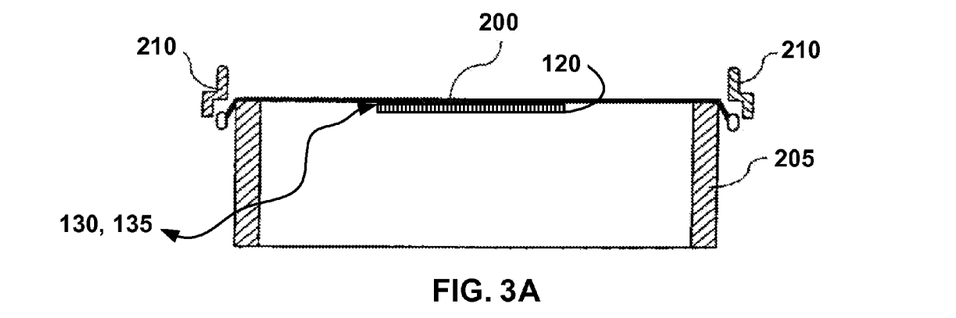
FIG. 3A—depicts an exemplary embodiment in which the electroactive material used for acoustical adjustment of the drum head depicted in a de-energized state.

FIG. 3A depicts a cross-section of a drum 205 including a drumhead 210 with an electroactive material 120 conjoined to the undersurface of the drum's vibratory element 200. Alternately, the electroactive material 120 may be conjoined to an intervening resilient material (not shown) such as a thin layer of rubber or foam which is advantageous when utilizing the rheological fluid embodiments of the electroactive material 120. The electroactive material 120 provides electronically controllable acoustical characteristics such as muting and/or tonal modification based upon the degree to which the electroactive material 120 is energized. Electromotive force is routed to the electroactive material 120 through connections 130, 135 from the electromotive force unit 80. The controller unit 75 may be configured to selectively energize the electroactive material 120, varying the physical properties of the electroactive material 120 and thereby varying the muting and/or tonal modification effects imparted upon the vibratory element 200. The controller unit 75 may utilize either or both analog and digital electronic circuitry.

Figure 3B:
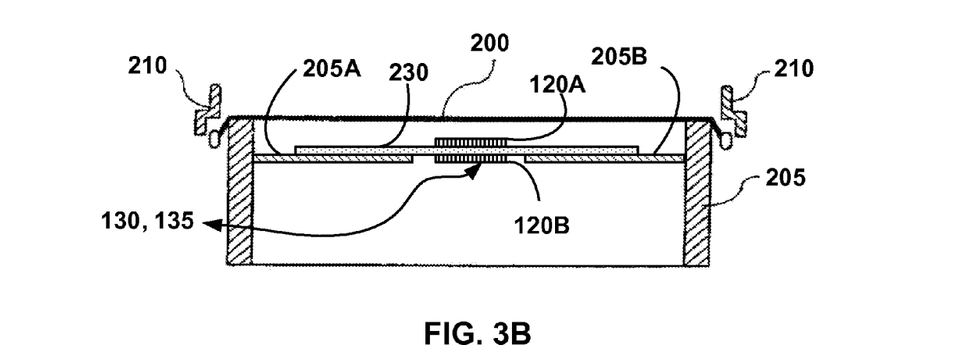
FIG. 3B—depicts an exemplary embodiment in which the electroactive material used for acoustical adjustment of the drum head depicted in an energized state.

FIG. 3B depicts another exemplary embodiment in which the electroactive material 120 used for acoustical adjustment of the vibratory element 200 is disposed in proximity to the vibratory element 200 forming an electronically controllable baffle. In this embodiment, the electroactive materials 120A, 120B may be integrated into a drum 205 such that the electroactive materials 120A, 120B may apply controllable back-pressure to the underside of the vibratory element 200 when energized as a result of pressure applied to the intervening air and/or to other employed intervening materials such as compressible foam (not shown). This embodiment utilizes existing tuned chamber supports 205A, 205B associated with the within the main air volume of the drum 205. The electroactive materials 120A, 120B are conjoined on the top and bottom surfaces of a second passive vibratory element 230 which receives deformation forces from the air column above its top surface area (and/or from other intervening materials) when the main vibratory element 200 is stuck. As before, the electromotive force 130 and feedback sensory response 135 electrodes are connected to the electromotive force generator 80. The applied electromotive force causes the electroactive materials 120A, 120B to deform thus causing planar forces to be applied to the passive vibratory element 230. As previously discussed the forces applied to the vibratory element 200 may controlled by the processing unit 100 to accentuate or inhibit one or more acoustical characteristics. In most embodiments, the actuation frequency of the electroactive material 120 is sufficiently rapid to allow near real time adjustment of the change in acoustical characteristic sought.

Figure 4:
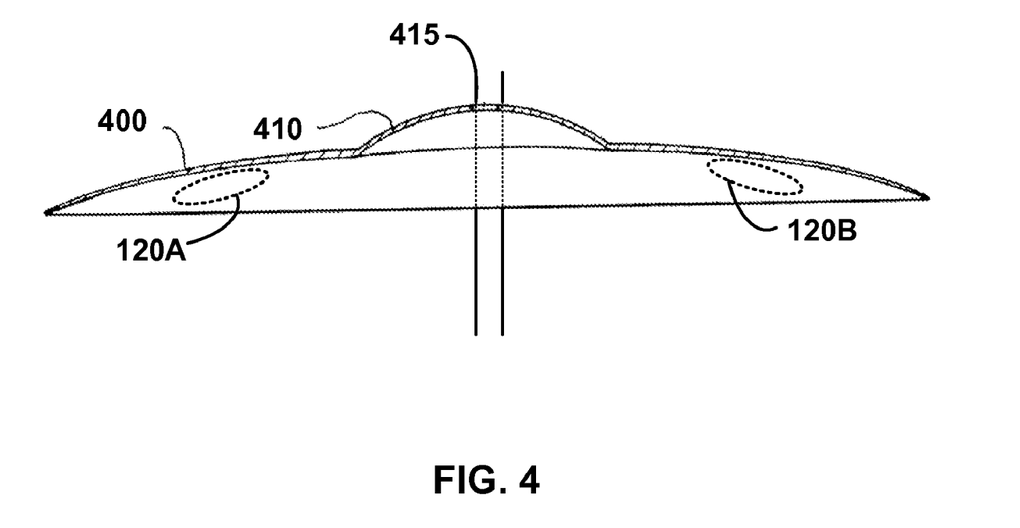
FIG. 4—depicts an exemplary embodiment in which an electroactive material is used for acoustical adjustment of a cymbal.

FIG. 4 depicts an exemplary embodiment in which one or more electroactive materials 120A,B are used for acoustical adjustment of a cymbal 400. In this embodiment, strategic placement of the more electroactive materials 120A,B on the underside of the cymbal 400 allows electronic control of the vibration response produced by the cymbal 400 when struck. Application of an electromotive force to one or both of the electroactive materials 120A,B causes a change in the material properties, for example a change in the stiffness and/or damping properties, to occur in the electroactive materials 120A,B. This results in a change in the vibratory response characteristics of the cymbal 400 to which the material is affixed and/or integrated and/or otherwise impacting. For example, reducing the stiffness of the electroactive material 120 A,B under electronic control may be performed in some embodiments to increase its damping (i.e. muting) effect upon the vibratory response characteristics of cymbal 400; the cymbal 400 itself, being the actual vibratory element 400.

Figure 4A:
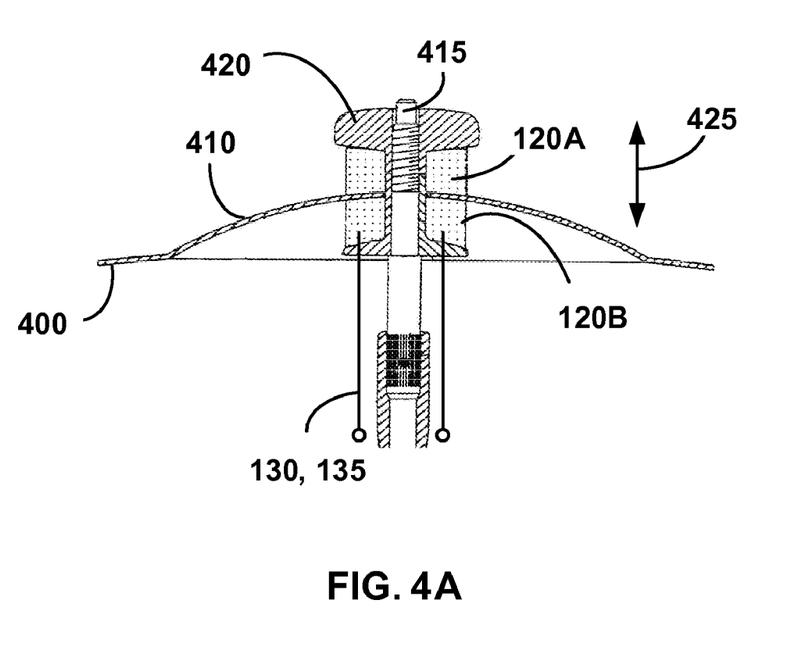
FIG. 4A—depicts another exemplary embodiment in which an electroactive material is used for acoustical adjustment of a cymbal.

FIG. 4A depicts another exemplary embodiment in which the electroactive materials 120 A,B is used for acoustical adjustment of a cymbal 400. In this exemplary embodiment, the support bell 410 of the cymbal 400 is suspended from an axial support member 415 dimensionally centered in the support bell. The cymbal 400 is suspended by a plurality of existing mounting hardware 420 in which the electroactive materials 120 A,B are sandwiched between the upper portion of the existing hardware 420 and the top surface of the support bell 410 and between the underside of support bell 410 and the lower portion of the existing mounting hardware 420. Application of an electromotive force 130 causes the electroactive materials 120 A,B to axially expand which produces an axial force on the cymbal 400 (vibratory element) which will change the acoustical characteristics of the cymbal 400. The cymbal 400 encountering the axial compressive forces exerted by either or both the electroactive materials 120 A,B will cause any vibrations occurring to be damped. As previously discussed, the electroactive materials 120 A,B may be controlled individually and at a particular frequency(ies) to accentuate or inhibit one or more particular acoustical characteristics.

Figure 4B:
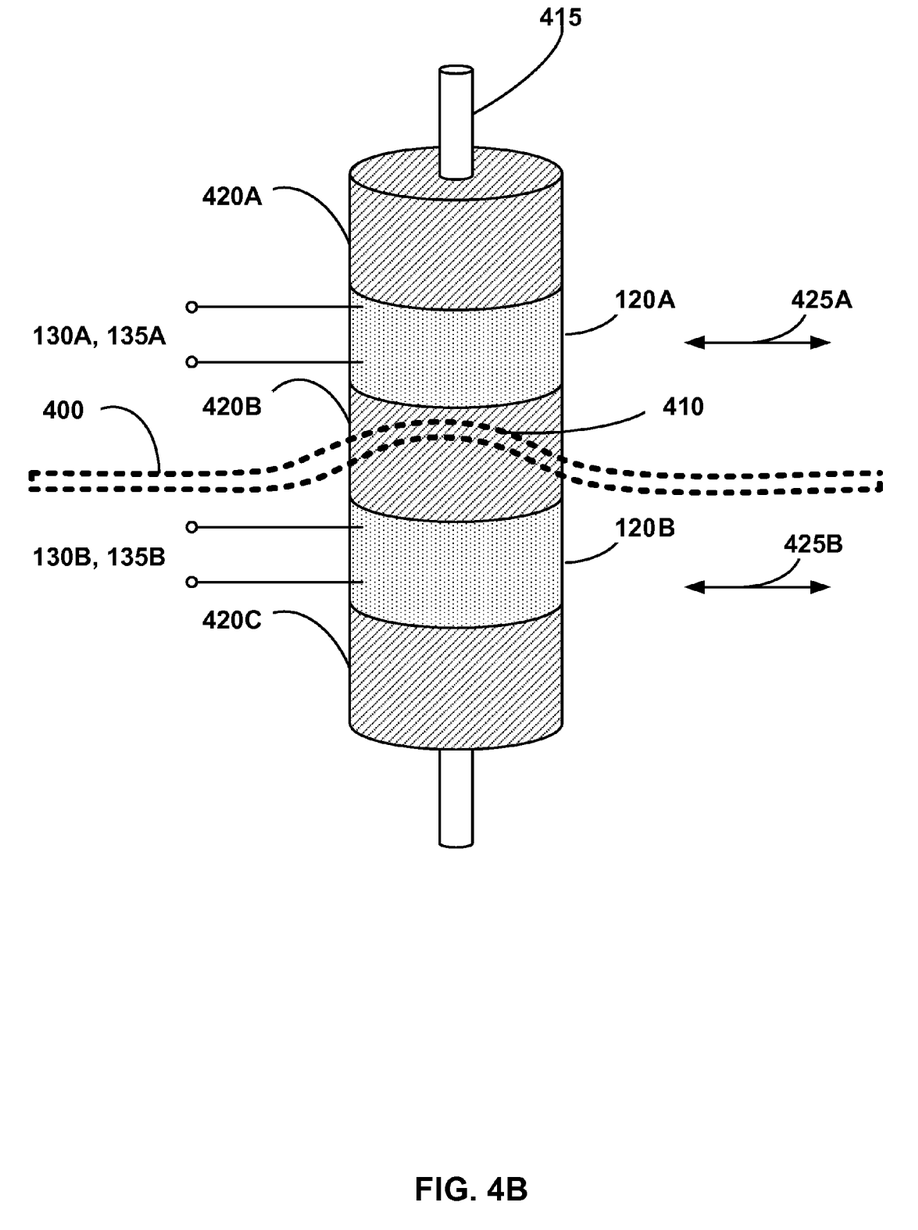
FIG. 4B—depicts another exemplary embodiment in which an electroactive material is used for acoustical adjustment of a cymbal.

FIG. 4B depicts another exemplary embodiment in which one or more electroactive materials 120 A,B are used for acoustical adjustment of a cymbal 400. In this embodiment, the support bell 410 is sandwiched between alternating layers of existing mounting hardware 420 A,B,C and electroactive materials 120 A,B. In this embodiment, the application of an electromotive force 130 causes the electroactive materials 120 A,B to laterally expand thus reducing the compressive forces being exerted on the support bell 410 thus allowing greater vibratory motion of the cymbal 400. Again, as previously discussed, the electroactive materials 120 A,B may be controlled individually and at a particular frequency(ies) to accentuate or inhibit one or more acoustical characteristics.

Figure 5:
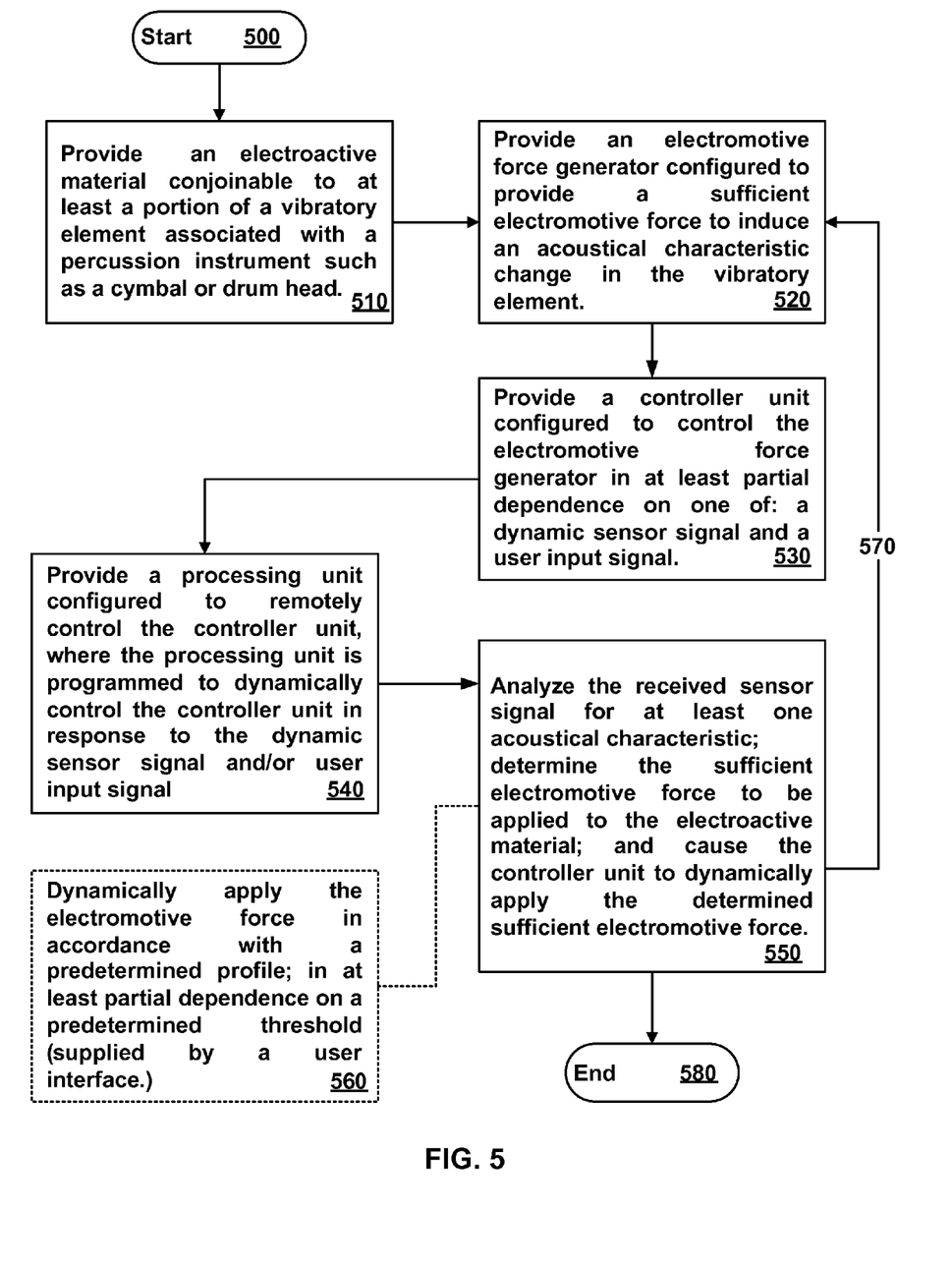
FIG. 5—depicts a flow chart of the various exemplary processing embodiments described herein.

FIG. 5 depicts a flow chart of certain exemplary processing embodiments utilizing the electroactive materials described herein. The process begins 500 by providing an electroactive material conjoinable to at least a portion of a vibratory element associated with the percussion instrument such as a cymbal or drum head 510. In an embodiment, the electroactive material is conjoined to the vibratory element such that application of a sufficient electromotive force to the electroactive material causes a change in the acoustical characteristics of the combined system of the vibratory element and conjoined electroactive material.

This change in acoustical characteristics is produced as a result of a change in the physical material properties of the conjoined electroactive material under electronic control, for example a change in the stiffness and/or damping properties of the electroactive material. An electromotive force generator is provided and operatively coupled to the electroactive material 520. The electromotive force generator is configured to provide the sufficient electromotive force to cause the desired change in the material properties of the conjoined electroactive material and thereby cause the desired change in acoustical characteristics of the desired vibration element of the percussion instrument.

A controller unit is then provided and operatively coupled to the electromotive force generator. The controller unit is configured to control the electromotive force generator in response to a dynamic sensor signal and/or user input signal 530. The dynamic sensor signal may be provided either directly from the electroactive material or from a separate sensor. The user input signal would be provided via a user interface.

In an embodiment, a processing unit is provided and configured to remotely control the controller unit. The processing unit is programmed to dynamically control the controller unit in response to the dynamic sensor signal and/or user input signal 540. The at least one application is further programmed to analyze the received sensor signal for at least one acoustical characteristic to determine the sufficient electromotive force to be applied to the electroactive material and cause the controller unit to apply the determined sufficient electromotive force 550. In one exemplary embodiment, the dynamic application of electromotive force may be part of predetermined profile and/or in at least partial dependence on a predetermined threshold. The predetermined threshold being supplied by a musician via a user interface coupled to the processing unit 560.

The process may be accomplished in a feedback loop 570 in which the determined appropriate electromotive force is applied to the electroactive materials until the accentuated or attenuated acoustical effect has been accomplished thus ending the process 580.

The various exemplary inventive embodiments have been described in detail with reference to various embodiments. It should be appreciated that the specific embodiments described are merely illustrative of the principles underlying the inventive concept. It is therefore contemplated that various modifications of the disclosed embodiments will, without departing from the spirit and scope of the invention, be apparent to persons of ordinary skill in the art. As such, the foregoing described embodiments of the invention are provided as exemplary illustrations and descriptions. They are not intended to limit the invention to any precise form or embodiment described. In particular, it is contemplated that functional implementation of the invention described herein may be implemented equivalently in hardware, software, firmware, and/or other available functional components or building blocks. No specific limitation is intended to a particular arrangement or process sequence. Other variations and embodiments are possible in light of above teachings, and it is not intended that this Detailed Description limit the scope of invention, but rather by the Claims following herein.

What is claimed:

1. An apparatus for controlling acoustical characteristics of a percussion instrument comprising:
    an electroactive material conjoined to a vibratory element associated with the percussion instrument, wherein the electroactive material is one of; an electroactive polymer, a magnetorheological fluid, and an electrorhelogical fluid;
    an electromotive force generator operatively coupled to the electroactive material and configured to provide an electromotive force to produce a conformational change in the electroactive material sufficient to induce an acoustical characteristic change in the vibratory element; and
    a controller unit coupled to the electromotive force generator and configured to selectively cause the electromotive force generator to provide the sufficient electromotive force based in at least partial dependence on one of; a dynamic sensor signal and a user input signal.

2. The apparatus according to claim 1 wherein the electromotive force generator is configured to generate an electromotive force in excess of 400 volts.

3. The apparatus according to claim 1 wherein the controller unit is configured to vary the electromotive force in accordance with a predetermined force requirement.

4. The apparatus according to claim 1 wherein the controller unit is configured to vary the electromotive force in accordance with a predetermined time-varying profile.

5. The apparatus according to claim 1 wherein the controller unit further includes a programmable logic circuit configured to vary the electromotive force in accordance with a logical representation of predetermined threshold levels associated with the dynamic sensor signal.

6. The apparatus according to claim 1 wherein the electroactive material is disposed as a laminate within a polymeric matrix coupled to the vibratory element.

7. The apparatus according to claim 1 wherein the electroactive material is disposed within a polymeric matrix which comprises the vibratory element.

8. The apparatus according to claim 5 wherein the controller unit is configured to dynamically receive the dynamic sensor signal generated by the electroactive material when the electroactive material is deformed by a physical force.

9. The apparatus according to claim 1 wherein the controller unit is further configured to dynamically vary the electromotive force in response to the dynamic sensor signal.

10. The apparatus according to claim 1 wherein the controller unit is further configured to dynamically vary the electromotive force in response to dynamic user input.

11. The apparatus according to claim 1 wherein the vibratory element is associated with one of; a cymbal and a drum head.

12. A system for controlling acoustical characteristics of a percussion instrument comprising:
    an electroactive material conjoined to a vibratory element associated with the percussion instrument;
    an electromotive force generator operatively coupled to the electroactive material and configured to provide an electromotive force to produce a conformational change in the electroactive material sufficient to induce an acoustical characteristic change in the vibratory element;
    a controller unit coupled to the electromotive force generator and configured to selectively cause the electromotive force generator to provide the sufficient electromotive force in dependence on a control signal; and,
    a processing unit operatively coupled to the controller unit; and programmed to at least one dynamically provide the control signal to the controller unit in at least partial dependence on one of; the dynamic sensor signal, the user input signal, a predetermined profile and any combination thereof.

13. The system according to claim 12 wherein the dynamic sensor signal is generated by the electroactive material in response to a deformation force being applied to the vibratory element.

14. The system according to claim 12 wherein the processing unit is further programmed to;
analyze the dynamic sensor signal for at least one acoustical characteristic;
determine the sufficient electromotive force to be applied to the electroactive material; and,
send the control signal to the controller unit to apply the determined electromotive force.

15. The system according to claim 12 wherein conjoined is one of: integrated into the vibratory element, affixed to the vibratory element and coupled to the vibratory element through an intervening material.

16. The system according to claim 12 wherein the induced change in the acoustical characteristic is one of; frequency response, resonance time, vibration amplitude and any combination thereof.

17. The system according to claim 12 wherein the change in the acoustical characteristic is provided dynamically in dependence on the dynamic sensor signal in a feedback relationship where the electroactive material provides the dynamic sensor signal to at least the controller unit.

18. A method for controlling acoustical characteristics of a percussion instrument comprising:
providing an electroactive material conjoinable to at least a portion of a vibratory element associated with the percussion instrument, wherein the electroactive material is conjoined to the vibratory element such that application of a sufficient electromotive force to the electroactive material induces an acoustical characteristic change in the vibratory element;
providing an electromotive force generator configured to provide the sufficient electromotive force;
providing a controller unit configured to control the electromotive force generator in at least partial dependence on one of; a dynamic sensor signal and a user input signal; and
providing a processing unit configured to remotely control the controller unit and programmed to dynamically control the controller unit in at least partial dependence on one of; the dynamic sensor signal and the user input signal.

19. The method according to claim 18 wherein the processing unit is further programmed to:
analyze the dynamic sensor signal for at least one acoustical characteristic;
determine the sufficient electromotive force to be applied to the electroactive material; and
cause the controller unit to dynamically apply the determined sufficient electromotive force to the electroactive material.

20. The method according to claim 18 wherein the vibratory element is associated with one of; a cymbal and a drum head.

21. The method according to claim 18 wherein the processing unit is further programmed to cause the controller unit to dynamically apply the electromotive force in accordance with a predetermined profile.

22. The method according to claim 18 wherein the processing unit is further operative to cause the controller unit to dynamically apply the electromotive force in at least partial dependence on a predetermined threshold level.

23. The method according to claim 22 wherein the predetermined threshold level is user adjustable through a user interface associated with the processing unit.

24. An apparatus for controlling acoustical characteristics of a percussion instrument comprising:
an electroactive material conjoined to a vibratory element associated with the percussion instrument;
an electromotive force generator operatively coupled to the electroactive material and configured to provide an electromotive force to produce a conformational change in the electroactive material sufficient to induce an acoustical characteristic change in the vibratory element; and
a controller unit coupled to the electromotive force generator and configured to selectively cause the electromotive force generator to provide the sufficient electromotive force based in at least partial dependence on one of; a dynamic sensor signal and a user input signal, and wherein the controller unit is further configured to vary the electromotive force in accordance with a predetermined time-varying profile.

25. An apparatus for controlling acoustical characteristics of a percussion instrument comprising:
an electroactive material conjoined to a vibratory element associated with the percussion instrument;
an electromotive force generator operatively coupled to the electroactive material and configured to provide an electromotive force to produce a conformational change in the electroactive material sufficient to induce an acoustical characteristic change in the vibratory element; and,
a controller unit coupled to the electromotive force generator and configured to selectively cause the electromotive force generator to provide the sufficient electromotive force based in at least partial dependence on one of; a dynamic sensor signal and a user input signal, and wherein the controller unit is further configured to dynamically vary the electromotive force in response to the dynamic sensor signal.

26. An apparatus for controlling acoustical characteristics of a percussion instrument comprising:
an electroactive material conjoined to a vibratory element associated with the percussion instrument;
an electromotive force generator operatively coupled to the electroactive material and configured to provide an electromotive force to produce a conformational change in the electroactive material sufficient to induce an acoustical characteristic change in the vibratory element; and,
a controller unit coupled to the electromotive force generator and configured to selectively cause the electromotive force generator to provide the sufficient electromotive force based in at least partial dependence on one of; a dynamic sensor signal and a user input signal, and wherein the controller unit is further configured to dynamically vary the electromotive force in response to dynamic user input.

* * * * *

UNITED STATES PATENT AND TRADEMARK OFFICE
CERTIFICATE OF CORRECTION

PATENT NO. : 7,394,014 B2 Page 1 of 1
APPLICATION NO. : 11/421394
DATED : July 1, 2008
INVENTOR(S) : Louis B. Rosenberg It is certified that error appears in the above-identified patent and that said Letters Patent is hereby corrected as shown below:

Column 1, line 66, after "comprises" insert --:--.
Column 2, line 39, after "comprises" insert --:--;
Column 2, line 51, delete "of;" and insert --of:--;
Column 2, line 55, delete "to;" and insert --to:--;
Column 2, line 61, delete "of;" and insert --of:--;
Column 3, line 19, delete "comprises;" and insert --comprises:--;
Column 3, line 27, delete "of;" and insert --of:--.

Claim 1, column 14, lines 1 and 12, delete "of;" and insert --of:--.
Claim 11, column 14, line 46, delete "of;" and insert --of:--.
Claim 12, column 14, line 63, delete "one".
Claim 14, column 15, line 6, delete "to;" and insert --to:--.
Claim 16, column 15, line 18, delete "of;" and insert --of:--.
Claim 18, column 15, lines 39 and 44, delete "of;" and insert --of:--.
Claim 20, column 15, line 56, delete "of;" and insert --of:--.
Claim 24, column 16, line 20, delete "of;" and insert --of:--.
Claim 25, column 16, line 37, delete "of;" and insert --of:--.
Claim 26, column 16, line 55, delete "of;" and insert --of:--.

Signed and Sealed this

Twenty-third Day of December, 2008

JON W. DUDAS
*Director of the United States Patent and Trademark Office*